United States Patent Office 3,538,342
Patented Nov. 3, 1970

3,538,342
DEVICE FOR CONTROLLING AN INVERTER
Arne Jensen, Havnbjerg, Als, and Tom Kastrup Petersen, Nordborg, Denmark, assignors to Danfoss A/S, Nordborg, Denmark, a company of Denmark
Filed Aug. 28, 1968, Ser. No. 755,878
Claims priority, application Germany, Aug. 29, 1967, D 53,957
Int. Cl. H02m 7/52
U.S. Cl. 307—106                                            5 Claims

ABSTRACT OF THE DISCLOSURE

In a pulse generator for a power converter, an input waveform is fed to a differential amplifier serving as a zero detector which has two outputs of opposite phase. Each output is differentiated and used as blocking pulses; each output is also delayed and then differentiated and used as firing pulses. The firing and blocking pulses overlap each other.

---

This invention relates to a device for controlling an inverter which comprises two first rectifiers for the load current, controlled by firing pulses, and two second rectifiers for blocking the first rectifiers, controlled by blocking pulses.

Four kinds of pulses in accurate time relationship to one another are needed to control an inverter of this type. To initiate the conducting period of one load rectifier, a firing pulse must be transmitted, but not before a blocking pulse has rendered the other load rectifier non-conductive. On termination of this conducting period, a blocking pulse must be transmitted, in order to block the first-mentioned load rectifier, and immediately afterwards a firing pulse, in order to fire the second load rectifier. Moreover, the blocking pulse and the subsequent firing pulse should be clearly separated in time without, however, leaving an interval long enough to impair the efficiency of the inverter. Known pulse generators for this purpose have very complicated circuit arrangements. The present invention has for its object a control device operating with a very simple circuit layout.

This object is achieved, according to the invention, by providing a square wave representing the desired voltage across the load and an identical square wave of opposite phase, and by differentiating these two square waves first without time delay, in order to produce the blocking pulses and then after a time delay in order to produce the firing pulses.

A phase-displaced square wave can be produced by very simple means. With such an arrangement, both square waves can be processed in identical manner. Using identical differentiating circuits, one square wave becomes responsible for the pulses at one slope and the other square wave for the pulses at the other slope of the input voltage oscillation.

In a preferred circuit arrangement, two square waves of opposite phase are derived at the two outputs of a zero-level detector comprising either a differential amplifier or a high gain push-pull amplifier to the input of which is applied a signal representing at least the cross-overs points of the desired voltage across the load. Using the two output voltages of the zero-level detector, the desired phase-displaced square waves are obtained without any need for further devices.

In particular, a differential amplifier with two complementary transistors in both branches can be employed, the input signal being applied to the base of the first, and zero potential to the base of the second input transistor, the square waves being derived at the collectors of the two output transistors. Apart from its simplicity, this circuit provides a satisfactorily zero-balanced zero-level detector.

Further according to the invention, an RC-differentiating element for the blocking pulse may be directly connected to each of the two outputs of the zero-level detector, as well as to the inputs of a symmetrically controlled differential amplifier. In each case an RC-differentiating circuit for the firing pulse is connected to the outputs of the differential amplifier. The remarkable feature of such an arrangement is that there is no actual time delay circuit. The desired delay is obtained merely due to the fact that the slopes of the square voltages derived across the zero-level detector are flattened by the differentiating circuit for the blocking pulse. Due to this flattening of the pulse slope, the differential amplifier is fully conducting only after a small time delay.

A known pulse amplifier stage with a pulse transformer may be connected to the output of each differentiating circuit, to obtain decoupling in addition to amplifiication.

The blocking pulse preceding the firing pulse preferably has a duration such as to partly overlap the firing pulse. This makes it possible, in the high-current section, to recharge, by means of the load rectifier just having fired, the commutating capacitor of the blocking rectifier which, at this moment, is to be rendered non-conductive.

In further development of the invention, at least the pulse amplifying stage for the firing pulses may be connected to the supply voltage by means of a switch operating with a delay relative to the pulse amplifying stages for the blocking pulses. This ensures that, in the load circuit, the blocking circuits are set up before the load can be connected; it is a safeguard against the eventuality of the load rectifiers becoming incapable of cut-off due to non-charging of the blocking circuits.

The invention will now be explained in further detail with reference to an embodiment thereof illustrated in the drawings.

Figure 1:
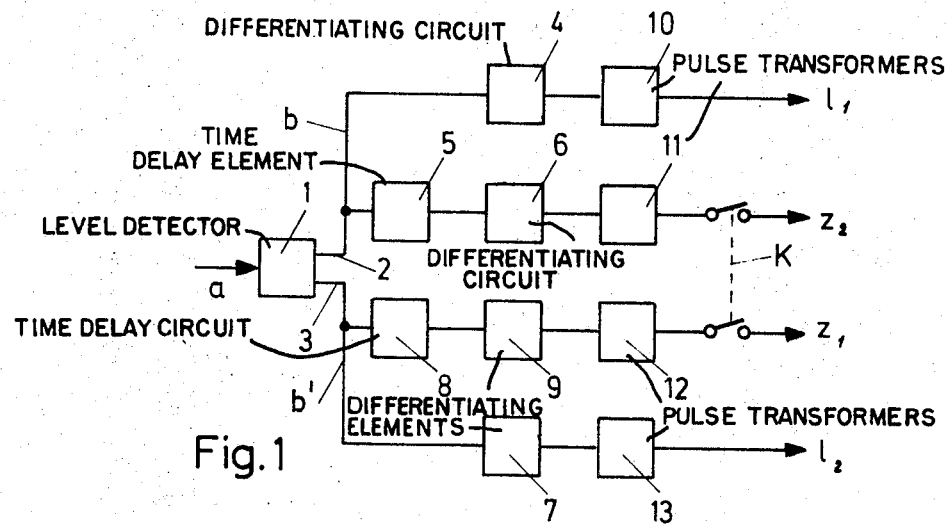
FIG. 1 shows a block diagram of a pulse generator of the invention.

FIG. 1 shows that an input signal is applied to a zero-level detector 1 whose characteristic corresponds at least to the crossovers of the desired viltage across the load. The zero-level detector has two outputs 2 and 3. From the output 2 a first branch is taken to a differentiating circuit 4 and a second branch via a time delay element 5 to a differentiating circuit 6. From the output 3, a first branch is taken to a differentiating element 7 and a second branch via a time delay circuit 8 to a differentiating element 9. Allocated to each of these differentiating elements is a pulse stage 10–13, preferably a pulse transformer. From these pulse stages are derived the blocking pulses $l_1$ and $l_2$ and the firing pulses $z_1$ and $z_2$. The blocking pulses are transmitted immediately upon the device being switched on whereas the firing pulses are only transmitted after a switch K is closed, so that at first only blocking pulses are produced. Firing and blocking pulses are produced together only at a later stage.

Figure 2:
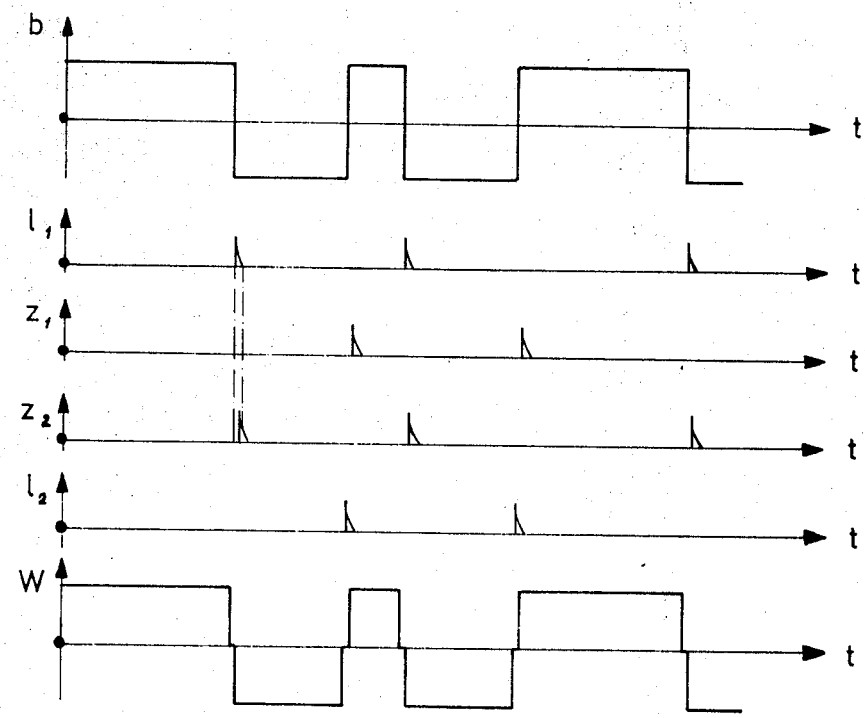
FIG. 2 show the characteristics of input voltage and output pulses.

FIG. 2 shows in the first line the signal $b$ derived at the output 2 of the zero-level detector 1. Signal $b'$ at the output 3 is of the same shape, but 180° phase-displaced. As can easily be seen, this circuit generates the pulses $l_1$, $z_1$, $z_2$ and $l_2$. The firing pulses follow the associated blocking pulse always after a short interval but still with a slight overlap, see lines 2–5 of FIG. 2. In this way it becomes possible to generate in the high-current section a voltage W according to line 6 of this drawing. By way of example, pulses of a total duration of 30 to 40 microseconds, with an overlap of about 10 microseconds are typical.

Figure 3:
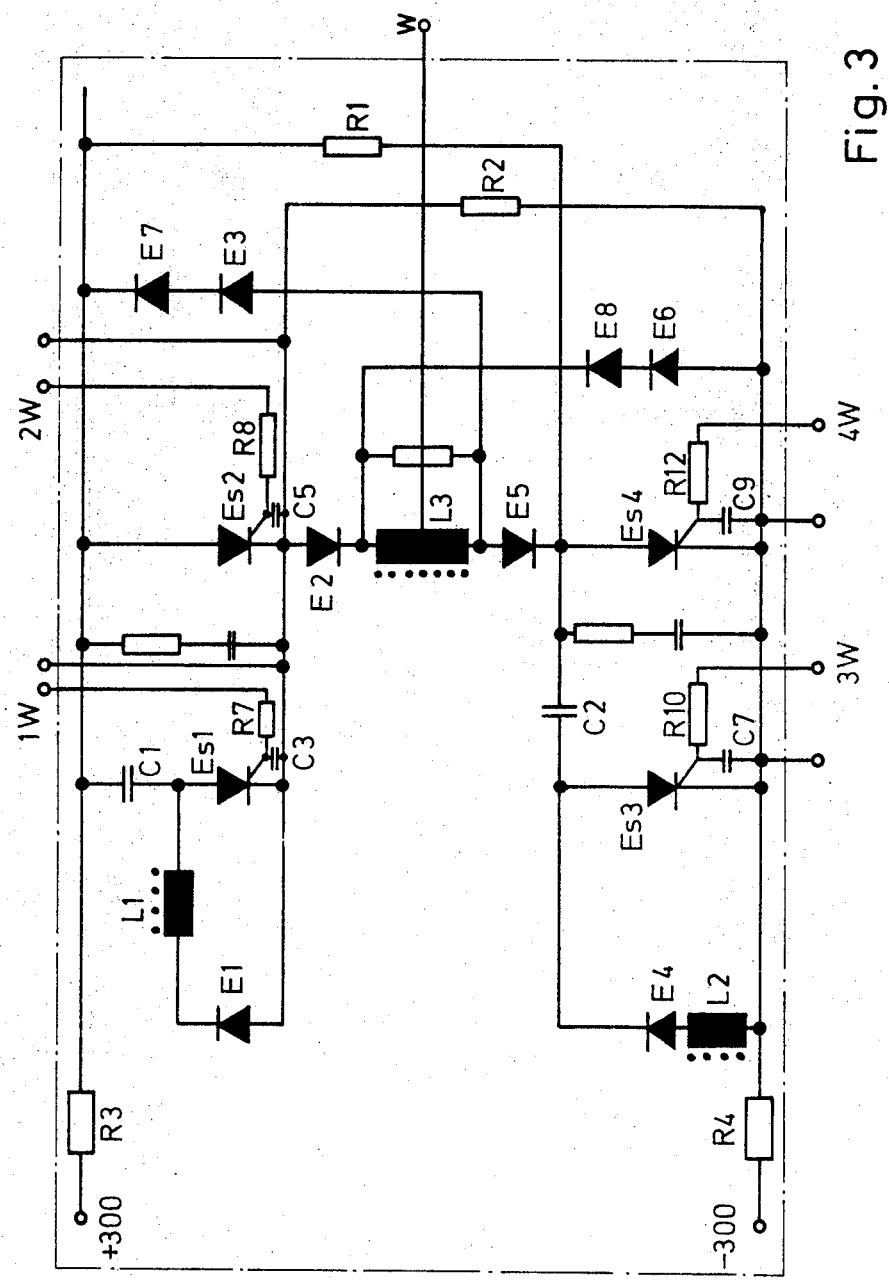
FIG. 3 shows the circuit arrangement of an inverter driven according to the invention.

According to FIG. 3, the voltages available in the high-current section to supply the phase load W are positive and negative voltage of 300 v. respectively. The current path from the positive terminal of the voltage source leads through a resistor R3, a controlled load rectifier Es2, a rectifier E2 and the first half of an inductance Le to the terminal W. During the following half-wave, current flows from the terminal W through the upper half of the inductance Le, a rectifier E5, a second load rectifier Es4 and a resistor R4 to the negative terminal of the voltage source. Associated with the load rectifier Es2 is a commuting circuit comprising a blocking rectifier Es1 in series with a capacitor C1 and shunted by the series circuit of a diode E1 and an inductance L1. Similarly, the load rectifier Es4 is associated with a commuting circuit comprising a blocking rectifier Es3 in series with a capacitor C2 and shunted by the series circuit of a rectifier E4 and a inductance L2. Firing and blocking pulses for the several rectifiers Es1, Es2, Es3 and Es4 are applied to the terminals 1W, 2W, 3W and 4W. The control pulses are led via series circuits comprising a resistor and a capacitor, i.e. R7–C3, R8–C5, R10–C7 and R12–C9.

The load rectifier Es2, the rectifier E2 and the inductance L3 are shunted by back-to-back-connected non-controlled diodes E3 and E7. Similarly the inductance L3, the rectifier E5 and the load rectifier Es4 are shunted by the back-to-back-connected non-controlled rectifiers E6 and E8. Furthermore, there is a resistor R1 connecting the anodes of the two load rectifiers Es2, Es4, and a resistor R2 connecting the cathodes of these two load rectifiers. For a complete description of the circuit of FIG. 3 see my copending application Ser. No. 755,877 filed on Aug. 28, 1968.

Figure 4:
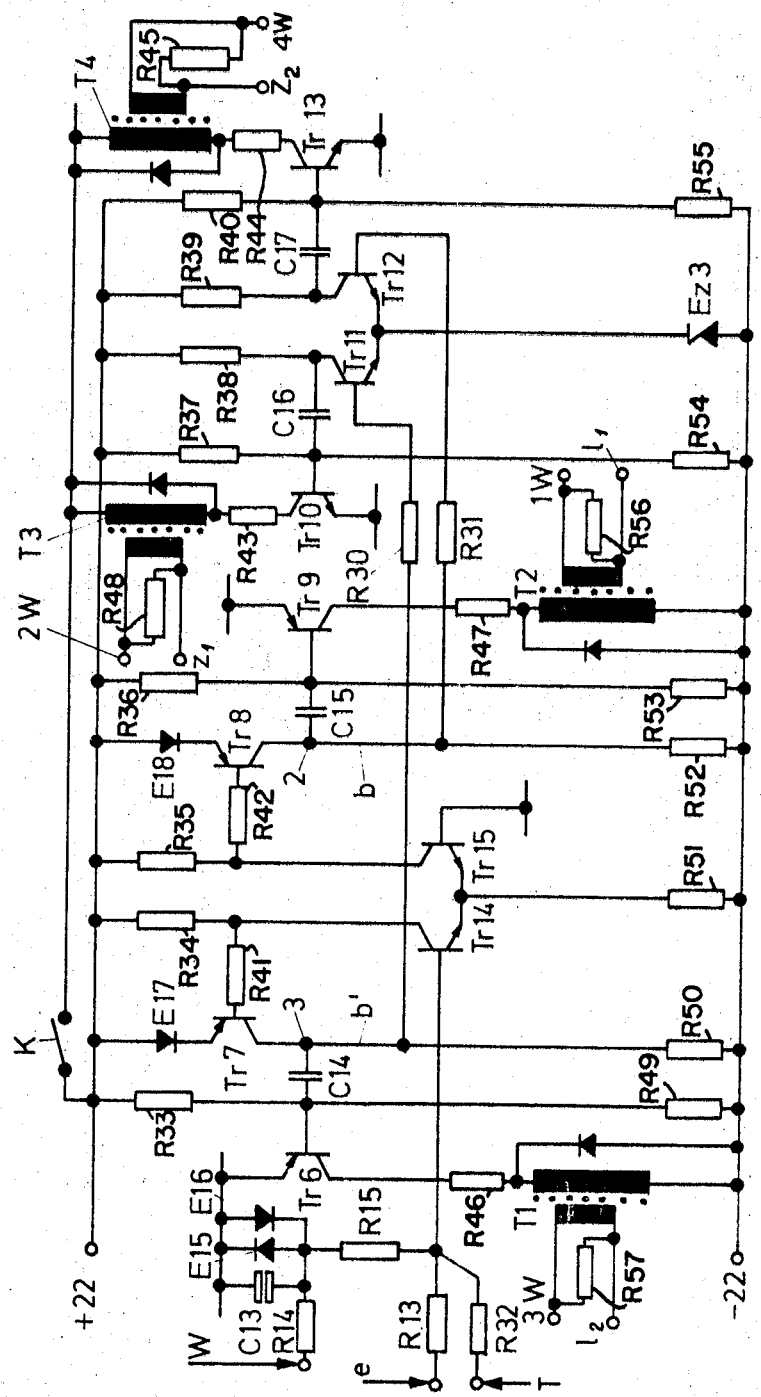
FIG. 4 shows the circuit diagram of a pulse generator according to the invention.

FIG. 4 shows a circuit diagram of the pulse amplifier for driving the controlled rectifiers Es1–Es4. It operates with a supply voltage of +22 v. and −22 v. Its input signal may be a simple square wave or a modulated signal at higher frequency, for example a triangular wave at a frequency of 1,000 Hz., a low-frequency signal, for example a trapezoidal wave at a frequency of 5–95 Hz. and a signal W fed back from the corresponding terminal of the high-current section. The initial singals are the blocking and firing pulses $l_1$, $l_2$, $z_1$ and $z_2$ derived from the terminals 1W, 2W, and 3W, 4W respectively. The signal W is applied to the zero point of the system through a resistor R14 and a smoothing capacitor C13, two antiparallel amplitude limiters in the shape of two diodes E5 and E6 shunting the latter. This enables a correcting signal to be applied via resistor R15 in such a way that the level of the following amplifier is shifted to compensate for the D.C. component.

The resistors R15, R13 and R32 add the last-mentioned signal, the higher-frequency signal $e$ and the low-frequency signal T and their sum is applied to the input of a zero-level detector. The latter consists essentially of a differential amplifier in which each branch is provided with two input transistors Tr14 (Tr15) and Tr7 (Tr8), the input signal being applied to the base of the transistor Tr14 while the zero potential of the system is applied to the base of transistor Tr15. The output amplifier comprises two transistors Tr7 and Tr8 the emitters of which are in each case preceded by a diode E17 and E18 respectively. Thus, the square wave $b$ can be derived at the output 2 and the square wave $b'$ of opposite phase at the output 3. The square wave $b$ is differentiated by means of a capacitor C15 and the signal transmitted to the output terminal 1W via a pulse stage consisting of a transistor Tr9 and a transformer T2. The output signal $b'$ is differentiated by means of a capacitor C14 and the signal transmitted to the output terminal 3W via a pulse stage consisting of a transistor Tr6 and a transformer T1. Besides, the two signals $b$ and $b'$ are applied via resistors R30 and R31 to the inputs of a symmetrically controlled differentiating amplifier comprising the transistors Tr11 and Tr12, the minimum operating voltage of these transisitors being determined by a Zener diode Ez3. The two output signals are differentiated by means of capacitors C16 and C17 and transmitted as firing pulses $z_1$ and $z_2$ to the terminals 2W and 4W by means of pulse stages comprising transistor Tr10 and transformer T3 and transistor Tr13 and transformer T4 respectively.

The two last mentioned transformers T3 and T4 become effective only when a switch K is operated whereas the transformers T1 and T2 transmit signals immediately upon operation of the main switch. This ensures that the load rectifiers Es2 and Es4 can only fire after the associated commuting circuits have been set up. Resistances R33 to R57 are connected as shown in FIG. 4.

The slopes of the signals $b$ and $b'$ are flattened by differentiation at the capacitors C14 and C15. Since the differential amplifier comprising transistors Tr11 and Tr12 begins only to conduct at a predetermined voltage level, the flattening of the slopes alone will produce the desired time interval between the firing pulses and the blocking pulses.

When the main switch is operated, at first only blocking pulses are transmitted. The blocking pulse $l_1$ causes the commuting capacitor C1 to become charged via the associated blocking rectifier Es1 and the resistor R2. The blocking pulse $l_2$ causes the commuting capacitor C2 to become charged via the resistor R1 and the associated blocking rectifier Es3. If the switch K is now operated, every blocking pulse is immediately followed by a firing pulse. The firing pulse $z_1$ causes load current to flow from the positive terminal of the voltage source through the load rectifier Es2, the rectifier E2 and the inductance L3 to the terminal W. At the same time the capacitor C1 is charged in that a current flows via the load rectifier Es2, the diode E1 and the inductance LL. Moreover, the capacitor C2 can be re-charged because current can flow from the inductance L3 via the rectifier E5 while the blocking rectifier Es3 remains open, due to the overlapping of blocking pulse and firing pulse.

The load rectifier Es2 continues to conduct while at least a holding current passes through it. When the blocking pulse $l_1$ is transmitted to the blocking rectifier Es1 the capacitor C1 discharges through the load rectifier Es2, so that the latter is blocked due to the lack of holding current. Immediately thereafter the load rectifier Es4 fires and the cycle continues with the negative half-wave of the load current. Here, too, the capacitor C2 is charged via the associated load rectifier, the inductance L2 and the diode E4. Furthermore, due to the overlapping of firing pulse and blocking pulse, the capacitor C1 can be re-charged, so that it will be available for the following commutation.

If there is an inductive load at W the current continues to flow in the same direction even after the load rectifier Es2 is blocked. In that case the terminal W will be at a negative potential lower than the potential at the negative terminal of the voltage source. Therefore, a current will pass through the non-controlled diodes E6 and E8 until the line current at W is reversed.

Yet, the load current will have decayed long before the load rectifier Es4 became blocked. Therefore, this rectifier would have ceased to conduct for lack of holding current if a holding current, present under all conditions, had not passed via the resistor R1 and the load rectifier Es4. The non-controlled diodes E3 and E7 and the resistor R2 perform the same task when the load rectifier Es2 fires.

The resistors R1 and R2 should be dimensioned such that, on one hand, the capacitors C1 and C2 are charged after a few cycles, for example two cycles, and, on the other hand, no large currents have to pass through these resistors during normal operation. In the illustrated circuit arrangement the resistors may be 20 kilo-ohm resistors, for example. With 0.2 μf. capacitors C1 and C2 charging takes place within approx. 10 ms.

What we claim is:

1. A device for generating timed pulses from an input signal comprising:
   means for zero detection of said input signal comprising a differential amplifier to generate two square wave outputs of opposite phase; first and second time delay means connected to said outputs of said zero detection means respectively, each having a delayed output; first through fourth means for differentiation coupled to said output of said zero detection means and said outputs of said time delay means, respectively.

2. A device as in claim 1, wherein said differential amplifier comprises first and second complementary transistors each having an emitter, base and collector means coupling said input signal to said first base means grounding said second base, and each of said square wave outputs being derived from said collectors.

3. A device as in claim 1 further comprising a symmetrical differential amplifier and wherein said time delay means each comprises a resistor and a capacitor coupled to each other and to the input of said differential amplifier and to said square wave outputs, and said differentiation means each comprises a resistor and a capacitor, two of said differentiation means being coupled to the output of said differential amplifier.

4. A device as in claim 3 further comprising first through fourth pulse amplifiers and first through fourth pulse transformers coupled respectively to the outputs of said amplifiers, means coupling said amplifiers to the output of said differentiation means respectively.

5. A device as in claim 1 wherein delayed pulses overlap underlayed pulses in time, and further comprising means for switching said delayed pulses independently of said undelayed pulses.

References Cited

UNITED STATES PATENTS

| | | |
|---|---|---|
| 3,181,053 | 4/1965 | Amato. |
| 3,207,974 | 9/1965 | McMurray. |
| 3,327,225 | 6/1967 | Schell _____ 328—63 X |
| 3,343,065 | 9/1967 | Gurnett. |
| 3,407,349 | 10/1968 | Lehrer et al. _____ 321—45 |

ROBERT K. SCHAEFER, Primary Examiner

T. B. JOIKE, Assistant Examiner

U.S. Cl. X.R.

328—63; 307—269; 321—45